June 15, 1948. E. B. THOMPSON 2,443,405
VEHICLE HOIST

Filed July 12, 1947 2 Sheets-Sheet 1

INVENTOR.
Elmer B. Thompson
BY Rudolph L. Lowell
Attorney

June 15, 1948. E. B. THOMPSON 2,443,405
VEHICLE HOIST
Filed July 12, 1947 2 Sheets-Sheet 2
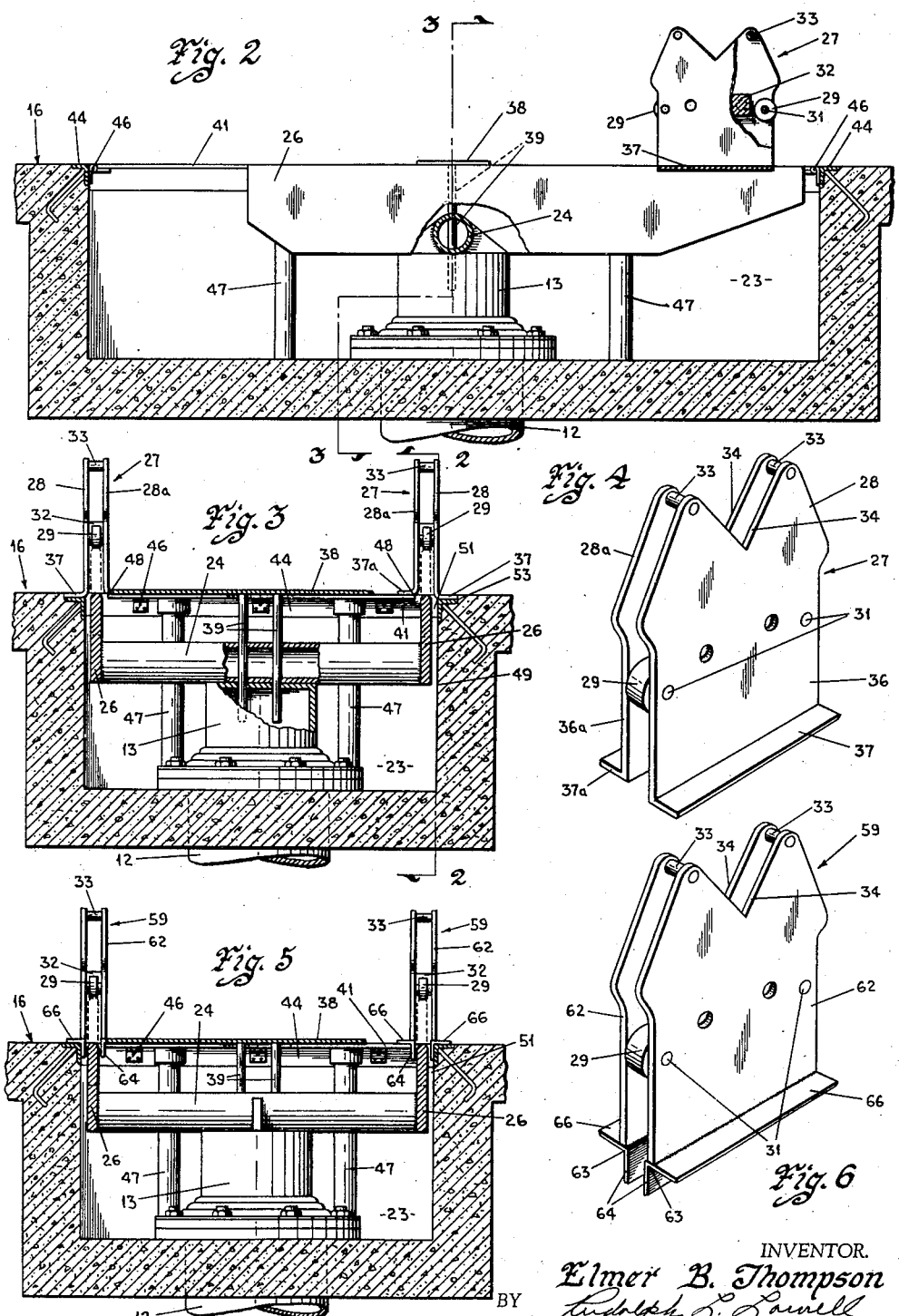
INVENTOR.
Elmer B. Thompson
BY Rudolph L. Lowell
Attorney Patented June 15, 1948

2,443,405

UNITED STATES PATENT OFFICE 2,443,405

VEHICLE HOIST

Elmer B. Thompson, Des Moines, Iowa, assignor to Globe Hoist Company, Des Moines, Iowa, a corporation of Iowa Application July 12, 1947, Serial No. 760,532

3 Claims. (Cl. 254—89)

This invention relates generally to vehicle hoists or lifts and in particular to an automobile hoist adapted to be lowered into a floor pit such that the floor space occupied by the hoist is free of any obstructions, and with the lift being capable of immediate use for lifting an automobile.

It is an object of this invention to provide an improved vehicle lift.

A further object of this invention is to provide a hoist of two-post type adapted to be lowered within the floor pit below the level of the floor surface, and of a construction such that the floor area occupied by the hoist can be safely and freely used when the hoist is in either a lowered or a raised position.

Another object of this invention is to provide a rear post for a two-post hoist which can be lowered within the floor pit to a position below the level of the floor surface through openings of such a narrow width that the openings can be left uncovered at all times without creating any physical hazard, or obstruction to the passage thereover of automobiles, wheel dollies, grease carts or the like.

A particular feature of this invention is found in the provision of a two-post hoist having a rear axle supporting structure including a pair of spaced longitudinally extended upright plate members, each of which carries an adjustable axle-engaging block on its top edge. Floor openings for receiving the plate members are of a width substantially equal to the thickness of a plate member plus a working clearance and the axle-engaging blocks are of a construction such that they can be located across the openings when the lift is in its lowered position, and then be engaged and carried in assembly relation on the plate members when the lift is raised. On lowering of the lift below the floor surface, the blocks are arrested at the floor surface entirely free of the plate members.

Further objects, features and advantages of this invention will become apparent from the following description when taken in connection with the accompanying drawings, in which:

Fig. 2 is a longitudinal sectional view of the rear axle supporting structure, taken along the line 2—2 in Fig. 3, and showing such structure in its lowered position within a floor pit;

Fig. 3 is a transverse sectional view of the rear axle supporting structure as seen along the line 3—3 in Fig. 2;

Fig. 4 is a perspective view of an axle-engaging block illustrated with the rear axle structure in Figs. 1, 2 and 3;

Fig. 5 is a transverse sectional view, illustrated similarly to Fig. 3, showing a modified form of axle-engaging block; and Fig. 6 is a perspective view of the axle-engaging block shown in Fig. 5.

Figure 1:
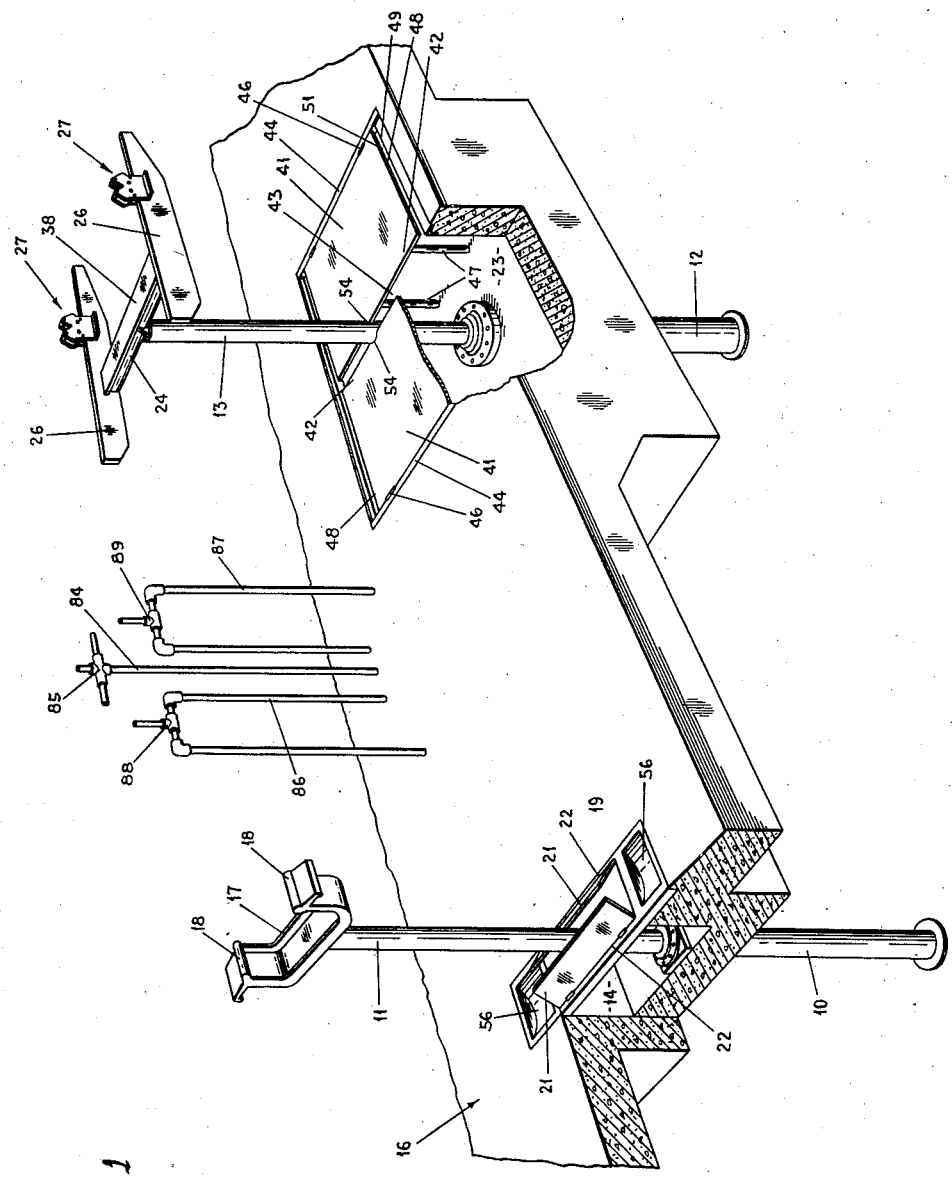
Fig. 1 is a perspective view of the hoist of this invention, with the hoist being shown in a raised position and having certain parts broken away to more clearly show its construction.

With reference to the drawings, there is shown in Fig. 1 an automobile hoist of two-post type including front and rear hoists, with the front hoist having a cylinder 10 and an associated piston or lifting member 11, and the rear hoist having a cylinder 12 and associated piston 13.

The front hoist is located in a pit 14 formed in a floor, indicated generally as 16, and includes a front axle supporting structure or saddle 17 of a substantially U-shape, which is fixed to the top of the piston 11. The free ends of the legs of the saddle 17 are provided with front axle-engaging members 18.

The opening 19 at the top of the front pit 14 is of a size and shape such that the saddle 17, at the lowermost limit of travel of the piston 11 is received within the pit 14 below the surface of the floor 16. On a lowering of the saddle 17 within the pit 14, the pit opening 19 is automatically closed by a pair of floor or cover plates 21 which are hinged at their outer sides 22 to opposite side walls of the pit 14 for pivotal movement upwardly and away from each other to their open positions, shown in Fig. 1. When the saddle 17 is within the pit 14, the cover plates 21 are carried in closed positions on the axle-engaging members 18.

Thus when the piston 11 is initially raised, the cover plates 21 are pushed upwardly to their open positions by the saddle member 17. On a continued raising of the piston 11, the inner sides of the cover plates rest against the saddle member and piston 11 so as to be upwardly inclined toward each other, as shown in Fig. 1, to constitute side guards for the pit opening 14, so as to prevent any accidental slipping by a person into the pit. When the front hoist is in its lowered position, the cover plates 21 are substantially flush with the floor 16.

The rear hoist is mounted in a floor pit 23 and includes a rear axle supporting structure having a transversely extended tubular beam member 24 fixed at its center portion to the top of the piston 13 (Figs. 1, 2 and 3). Suitably secured to opposite ends of the beam member 24 are longitudinally extended flat upright plate or frame members 26.

Rear axle-engaging blocks, indicated generally as 27, are movably carried on the top edges of the upright plate members 26 for movement longitudinally thereof to axle-engaging positions. Each block 27 (Figs. 2 and 4) is comprised of a pair of spaced side members 28 and 28a having a pair of rollers 29 rotatably carried therebetween on shafts 31 at positions intermediate their ends. The side plates 28 and 28a are maintained in fixed relative positions by a block member 32 located between the rollers 29 and secured, as by welding, to the inner surfaces of the side members 28 and 28a. Spacer rods or pins 33 are connected between the top ends of the side members 28 and 28a to opposite sides of axle-receiving V-notches 34 formed in the side members.

The lower portions 36 and 36a of the side plates 28 and 28a, below the rollers 29, are spaced a distance apart adapted to straddle the upper ends of the upright frame members 26 so that the rollers 29 are ridable on the top edges of the frame members 26. The lower portions 36 and 36a of the side plates 28 and 28a, respectively, thus constitute guide members for maintaining the axle blocks 27 in assembly positions on the frame members 26.

Extended laterally outwardly from the bottom edges of the lower portions 36 and 36a, of the side plates 28 and 28a, respectively, are projections or feet 37 and 37a, with the projections 37 being below the plane of the projection 37a for a purpose which will appear later. Stated otherwise, the portion 36 from the roller shafts 31 is longer than the portion 36a.

Adapted to rest on the top of the tubular beam 24 at a position between the upright plate or frame members 26 is a vertically movable cover plate 38 (Figs. 1, 2 and 3) which is provided with a pair of downward extensions 39 guidably projected through the tubular beam 24 for movement within the top of the piston 13. As best appears in Fig. 2, the width of the plate 38 is greater than the diameter of the tubular beam 24 so that the sides of the plate extend outwardly to each side of the tubular beam 24.

The opening of the rear pit 23 is of a size and shape such that when the piston 13 is in its lowermost position, the rear axle supporting structure is receivable therein at a position below the level of the floor 16. A closing of the pit opening, when the rear hoist is in either a lowered or raised position, is accomplished by the provision of means including a pair of cover plates 41.

With reference to Fig. 1, it is seen that the cover plates 41 are of a substantially rectangular shape and have their inner sides 42 spaced from each other to form a transverse opening 43 for receiving the beam 24. Each end of the pit 23 (Fig. 2) is recessed to accommodate an angle iron 44 to which the outer sides of the cover plates 41 are hinged at 46 for up and down movement. Fixed adjacent the inner sides of the plates 41 are downwardly projected legs 47 which are of a length corresponding substantially to the depth of the pit 23, so as to support the cover plates 41 against downward pivotal movement at positions substantially flush with the surface of the floor 16. Complete accessibility to the pit 23 is accomplished by merely pivoting the plates 41 upwardly from their closed positions shown in Fig. 1.

Each end 48 of a cover plate 41 (Figs. 1 and 3) is spaced inwardly from an adjacent side 49 of the pit 23 to form a longitudinally extended opening 51 which is open to an end of the transverse opening 43, and adapted to loosely receive therethrough an upright plate member 26.

In one embodiment of the invention, each plate member 26 is about four feet long and three quarters of an inch thick. The side plates 28 and 28a, of an axle-engaging block 27, are about three-eights of an inch in thickness and spaced apart over their lower portions 36 and 36a, a distance substantially equal to the thickness of a plate member 26. Each longitudinal opening 51 is of a width substantially equal to the thickness of a plate 26 plus a working clearance. The working clearance, to opposite sides of a plate member 26, is on the order of about one fourth of an inch, so that the total overall width of a longitudinal opening 51 is on the order of about one and one-quarter inches.

It is seen, therefore, that an opening 51 is of a relatively narrow width so that it can be left uncovered at all times without creating any dangerous or hazardous pitfall for a person to slip into. As a result, wheel dollies, grease carts and the like can be readily driven over a longitudinal opening 51, and a person can easily step across or on an opening 51 with complete safety.

The top edges of the outer side walls 49 of the pit 23, which also constitute the outer side walls of the longitudinal openings 51, are recessed, as indicated at 53, to receive the foot 37 of the axle block side plate 28 in a mating relation. In other words, the foot 37 is vertically offset below the foot 37a by an amount equal to the depth of the recess 53 so that an axle block 27 is supported in an upright position when the foot 37 is within the recess 53, and the foot 37a is resting on the floor 16, for a purpose to be later noted.

The inner sides 42 of the cover plates 41 (Fig. 1) are formed intermediate their ends with oppositely arranged arcuate recesses 54 adapted to receive the piston 13 therebetween. By virtue of the recesses 54, the transverse opening 43, between the plate ends 42, is reduced to a width slightly larger than the diameter of the tubular beam 24 so as to be of a relatively narrow width while providing for the passage of the beam 24 therethrough to a position within the pit 23 and below the plates 41.

When the rear hoist is in its lowermost position of travel, the transverse opening 43 is covered by the plate 38, as shown in Figs. 2 and 3, so that the pit 23 is completely closed except for the longitudinal openings 51. However, as mentioned above, the openings 51 are of such a narrow width that they in no way interfere with the passing of vehicles or persons thereover. Further, the arcuate recesses 54 in the plates 41 are partially covered by the plate 38 when the rear hoist is in a lowered position, so that the floor space occupied by the rear hoist is substantially free and unobstructed.

On an initial raising of the piston 13, the frame members 26 are moved upwardly through the openings 51. On a continued raising of the piston 13, the cover plate 38 is engaged by the tubular beam 24 and lifted from the covers 41. When the piston 13 is lowered, the cover plate 38 remains in a supported position on the tubular beam 24 until the beam is received within the space 43 and substantially beneath the plates 41.

At this position of the beam 24 the opposite sides of the cover plates 38 are engaged and supported by the inner sides 42 of the plates 41 so as to be retained against further downward movement. The vertical movement of the cover plate 38 is thus entirely automatic, with the plate 38 in its raised position being supported on the beam 24 below the top level of the frame members 26.

In the operation of the hoist, assume the front and rear hoists to be in their lowered positions within the pits 14 and 23, respectively. An automobile is then driven over the hoist to a position in which the front wheels thereof are received in depressions 56 (Fig. 1) arranged at opposite sides of the pit 14. With the front wheels of the automobile located in the depressions 56 the automobile front axle is properly located above the saddle member 17 for engagement by the axle engaging members 18.

With the front axle of the automobile thus positioned for engagement with the members 18, the blocks 27 are extended across the longitudinal openings 51 with a foot 37 located within a recess 53, and a foot 37a resting on a cover plate 41. The arrangement of a foot 37 within a recess 53 aligns the side plates 28 and 28a of an axle block 27 in parallel alignment with a frame member 26 at a position to receive the frame member therebetween.

The axle blocks 27, in their aligned positions with the frame members 26, are movable longitudinally of the openings 51 to adjusted positions for engaging the rear axle of the automobile. In other words, the automobile front axle is spotted relative to the engaging members 18, and the blocks 27 are movable longitudinally of the openings 51, and in turn of the rear lift, to adjusted positions corresponding to the particular wheel base of the automobile to be lifted. With the front and rear hoists thus properly set for engaging the front and rear axles, respectively, of the automobile, the hoists are concurrently operated to raise the pistons 11 and 13 to desired elevations.

On an initial elevation of the rear hoist to a position indicated for the frame members 26 in dotted lines in Fig. 3, the members 26 are moved into an assembly relation with the axle blocks 27, between the lower portions 36 and 36a of the side plates 28 and 28a, respectively, and into contact engagement with the rollers 29. Thus on a continued elevation of the rear hoist, the axle blocks 27 are movable upwardly with the frame members 26.

When the rear hoist is lowered, the axle blocks 27 are movable downwardly with the frame members 26 until the feet 37 and 37a are engaged by the floor 16 and plates 41, respectively. At that time further downward movement of the axle blocks 27 is arrested, and the plate members 26 continue their downward movement out of an assembly relation with the axle blocks. As a result, when the frame members 26 are below the level of the floor 16, the blocks 27 are entirely free so that they can be picked up and removed until wanted for later use. Although the longitudinal openings 51 may be left entirely uncovered at all times, it is apparent that the downward movement of the piston 13 may be limited at a position providing for the top edges of the upright members 26 being substantially flush with the floor 16, as shown in full lines in Fig. 3. In this event, the openings 51 would be entirely closed except for the working clearances of the frame members 26.

In Figs. 5 and 6 there is illustrated a modified form of axle block 59 which is similar in all respects to an axle block 27 except for the construction of the lower ends of its side plates 62. Further, the rear hoist, illustrated in Fig. 5, is similar in all respects to the rear hoist illustrated in Figs. 1, 2 and 3, except that the recess 53 in the top edges of the side walls 49 of the pit 23 are eliminated. Similar numerals of reference will thus be used in Figs. 5 and 6 to designate like parts in Figs. 1, 2 and 3.

The axle blocks 59 (Figs. 5 and 6) are of a like construction and similarly assembled with the upright frame members 26. A block 59 includes a pair of spaced side members 62 held together in a spaced relation by a spacing block 32 and connecting pins 33. The blocks are movably supported on the upper edges of the frame members 26 by rollers 29. Secured to the bottom edges of each of the side members 62 are angle members 63 arranged so that their vertical legs 64 are adjacent to each other and in substantially the plane of a side member 62, while their horizontal legs 66 are extended laterally outwardly from the side members. It is contemplated that the side members 62 be formed of about a three-eighth inch plate material, and that the angle members be of a thickness of about three-sixteenths of an inch.

In the operation of the hoist, with the axle blocks 59, assume the rear hoist to be in its lowered position shown in Fig. 5. When in this position the legs 64 are positionable within the longitudinal openings 51 to opposite sides of an upright frame member 26, so that the block is supported in an upright position by the horizontal legs 66 resting on the tops of the opposite side walls of the openings 51. Thus on an initial elevation of the rear hoist the frame members 26 are received in a straddled relation between the lower end portions of the side members 62 with their top edges in riding contact with the rollers 29.

In a lowering of the hoist to its position within the pit 23, the horizontal legs 66 are engaged with the tops of the opposite side walls of the longitudinal openings 51 so as to arrest the downward movement of the blocks 59. As a result the blocks 59 are entirely free of the members 26 for removal from the longitudinal openings 51.

It is seen, therefore, that the legs 64 of the angle 63 are positionable within the confines of the working clearance of a plate member 26 within a longitudinal opening 51 and coact with the side walls of the longitudinal openings to locate the blocks 59 at positions such that they are received in assembly relation on the upright frame members 26, concurrently with an elevation of the hoist.

The pistons 11 and 13 are raised and lowered in a usual manner by means including a buried air pressure tank (not shown) connected with a compressor or the like (not shown) by an inlet pipe 84 having a control valve 85 (Fig. 1). The pressure tank is connected with the front cylinder 10 by means including a pipe 86, and the rear cylinder 12 is connected with the pressure tank through a pipe 87, with the pipes 86 and 87 being provided with control valves 88 and 89, respectively, which are conveniently located above the floor 16 for manipulation by the hoist operator. The cylinders 10 and 12 are of a usual hydraulic type, with the admission of air under pressure to a cylinder acting on the fluid in the cylinder to in turn raise a corresponding piston in a manner which is well known in the art.

From a consideration of the above description, it is seen that the invention provides an automobile hoist, in which the front and rear hoists are capable of being received entirely within floor pits and below the level of a floor surface, without leaving any objectionable or hazardous openings uncovered. The axle blocks on the rear hoist structure are completely removed from their assembly relation with such structure as it is lowered within the floor pit. Coacting portions on the axle blocks and on the floor are adapted to align the axle blocks relative to the upright frame members 26 so that the members 26 are moved into an assembly relation with the blocks concurrently with the raising of the hoist structure.

Although the invention has been described with respect to a preferred embodiment thereof, it is to be understood that it is not to be so limited since changes can be made therein which are within the full intended scope of this invention as defined by the appended claims.

I claim:

1. In a vehicle lift including a lift member mounted in a floor pit and movable to a lowered position within said pit below the level of the floor surface, an axle-supporting structure carried at the upper end of said lift member comprising a transverse beam member, a pair of oppositely arranged longitudinally extended substantially flat upright members fixed on said beam, said floor surface having a transverse opening therein for receiving said beam member, and a pair of longitudinal openings adapted to receive said upright members, axle-engaging blocks movably supported on said upright members to adjusted positions comprising upright side members having their lower portions spaced apart so as to receive the upper portions of said upright members in a straddling relation, and outwardly extended lateral projections adjacent the bottom edges of said side members adapted to rest on the opposite side walls of said longitudinal openings, with said longitudinal openings being of a width substantially equal to the thickness of an upright member plus a working clearance, whereby on lowering of the lift member within said floor pit, said axle-engaging blocks are arrested at the floor surface.

2. In a vehicle lift including a lift member mounted in a floor pit and movable to a lowered position within said pit below the level of the floor surface, an axle supporting structure carried at the upper end of said lift member comprising a transverse beam member, a pair of longitudinally extended substantially flat upright plate members at opposite ends of said transverse beam member, said floor surface having a transverse opening therein for receiving said beam member, and a pair of longitudinal openings adapted to receive said plate members, with said longitudinal openings being of a width substantially equal to the thickness of a plate member plus a working clearance, axle-engaging blocks movably supported on the top edges of said plate members to adjusted positions longitudinally thereof, oppositely arranged guide members on said blocks adapted to straddle said plate members and having their bottom edges engageable with opposite sides of said longitudinal openings, with one of said guide members being longer than the other thereof, and one of the side walls of said longitudinal openings having a longitudinally extended recess in its top side adapted to receive the lower end of said longer guide member therein, said blocks, on a lowering of said lift member within said floor pit, being arrested at the floor surface, and said longer guide member, on being located in said recess when the lift is in a lowered position, providing for the movement of said plate members between said guide members as the lift is raised.

3. In a vehicle lift including a lift member mounted in a floor pit and movable to a lowered position within said pit below the level of the floor surface, an axle-supporting structure carried at the upper end of said lift member comprising a transverse beam member, a pair of longitudinally extended substantially flat upright plate members at opposite ends of said beam member, said floor surface having a transverse opening for receiving said beam member therethrough, and a pair of longitudinal openings adapted to receive said plate members, with said longitudinal openings being of a width substantially equal to the thickness of a plate member plus a working clearance, axle-engaging blocks movably supported on the upper edges of said plate members having oppositely arranged downwardly extended guide members for straddling said plate members, with said guide members being engageable with the opposite side walls of said longitudinal openings, when said lift member is lowered below said floor surface to arrest the downward movement of said blocks at the floor surface, and coacting means on said guide members and said side walls for aligning said blocks relative to said plate members, when the lift is in a lowered position, to provide for the reception of the plate members between said guide members as the lift is raised.

ELMER B. THOMPSON.

REFERENCES CITED

The following references are of record in the file of this patent:

UNITED STATES PATENTS

| Number | Name | Date |
| --- | --- | --- |
| 2,015,357 | Weaver | Sept. 24, 1935 |
| 2,100,617 | Thompson | Nov. 30, 1937 |
| 2,423,954 | Thompson | July 15, 1947 |